US011927031B2

(12) United States Patent
Neveling et al.

(10) Patent No.: US 11,927,031 B2
(45) Date of Patent: Mar. 12, 2024

(54) PORTABLE ELECTRONIC LOCK

(71) Applicant: ABUS August Bremicker Söhne KG, Wetter-Volmarstein (DE)

(72) Inventors: Manuel Cornelius Neveling, Wetter (DE); Tobias Weiss, Schwerte (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 185 days.

(21) Appl. No.: 17/348,243

(22) Filed: Jun. 15, 2021

(65) Prior Publication Data

US 2021/0396043 A1 Dec. 23, 2021

(30) Foreign Application Priority Data

Jun. 17, 2020 (DE) ........................ 102020116008.9

(51) Int. Cl.
*E05B 45/06* (2006.01)
*E05B 47/00* (2006.01)
*E05B 47/06* (2006.01)

(52) U.S. Cl.
CPC .......... *E05B 45/06* (2013.01); *E05B 47/0002* (2013.01); *E05B 47/0012* (2013.01); *E05B 47/0607* (2013.01); *E05B 2045/065* (2013.01); *E05B 2047/0058* (2013.01); *E05B 2047/0067* (2013.01)

(58) Field of Classification Search
CPC ................ E05B 45/06; E05B 47/0002; E05B 2045/065; E05B 2047/0058; E05B 2047/0067
See application file for complete search history.

(56) References Cited

U.S. PATENT DOCUMENTS 5,712,626 A 1/1998 Andreou et al.
5,859,479 A 1/1999 David
6,095,661 A * 8/2000 Lebens ................. H05B 45/12 362/159

(Continued)

FOREIGN PATENT DOCUMENTS

DE 4229324 A1 3/1994
DE 102018111302 A1 11/2019

OTHER PUBLICATIONS

European Search Report regarding European Application No. 21176957.5, dated Nov. 18, 2021.

(Continued)

*Primary Examiner* — Mark A Williams
(74) *Attorney, Agent, or Firm* — Harness, Dickey & Pierce, P.L.C.

(57) ABSTRACT

A portable electronic lock has a lock body having a locking device and a closing hoop that is movable relative to the lock body between a closed position and an open position, wherein the closing hoop can be locked to the lock body by means of the locking device in the closed position. The lock at least has an electrical unit, an electrical energy source, a signal generator, and a control unit. The control unit is configured to monitor a charge level of the electrical energy source and to control the signal generator to output a charge level warning signal sequence in the form of the letter sequence "S-O-S" in accordance with Morse code if the charge level of the electrical energy source falls below a predetermined limit value.

13 Claims, 1 Drawing Sheet

(56) References Cited

U.S. PATENT DOCUMENTS

| | | | | |
|---|---|---|---|---|
| 6,389,854 | B1 * | 5/2002 | Huang | E05B 73/0082 70/164 |
| 7,236,085 | B1 * | 6/2007 | Aronson | G06Q 20/20 109/46 |
| 7,740,371 | B1 * | 6/2010 | Lebens | H05B 45/10 362/802 |
| 7,782,200 | B1 * | 8/2010 | Fleischmann | G09F 3/0394 70/330 |
| 8,633,799 | B1 * | 1/2014 | Aronson | E05B 47/0603 705/16 |
| 8,640,513 | B2 * | 2/2014 | Goren | E05B 67/10 70/284 |
| 9,302,615 | B2 * | 4/2016 | Carlson | B60Q 1/52 |
| 9,381,855 | B1 * | 7/2016 | Arnold | G08B 21/22 |
| 2001/0030873 | A1 | 10/2001 | Bingle et al. | |
| 2004/0233053 | A1 * | 11/2004 | Liao | G08B 7/062 340/539.1 |
| 2005/0231365 | A1 * | 10/2005 | Tester | G09F 3/0347 292/307 R |
| 2006/0288744 | A1 * | 12/2006 | Smith | G07C 9/33 70/38 B |
| 2007/0200716 | A1 * | 8/2007 | Haase | G08B 21/0202 340/574 |
| 2013/0118216 | A1 * | 5/2013 | Kalous | G07C 9/00944 70/20 |
| 2013/0255335 | A1 * | 10/2013 | Jonely | H02J 7/342 70/277 |
| 2015/0027178 | A1 | 1/2015 | Scalisi | |
| 2015/0091724 | A1 * | 4/2015 | Mok | G08B 21/02 340/539.11 |
| 2015/0186720 | A1 | 7/2015 | Tsou et al. | |
| 2015/0279137 | A1 * | 10/2015 | Bacon | E05B 81/66 70/278.1 |
| 2016/0145897 | A1 * | 5/2016 | Ilislamloo | G08B 13/24 70/57.1 |
| 2016/0237721 | A1 | 8/2016 | Asquith et al. | |
| 2018/0112840 | A1 * | 4/2018 | Rzasa | F21K 9/237 |
| 2019/0139394 | A1 * | 5/2019 | Kaur | G08B 21/22 |

OTHER PUBLICATIONS

Office Action regarding German Patent Application No. 102020116008.9, dated Mar. 9, 2021.

* cited by examiner

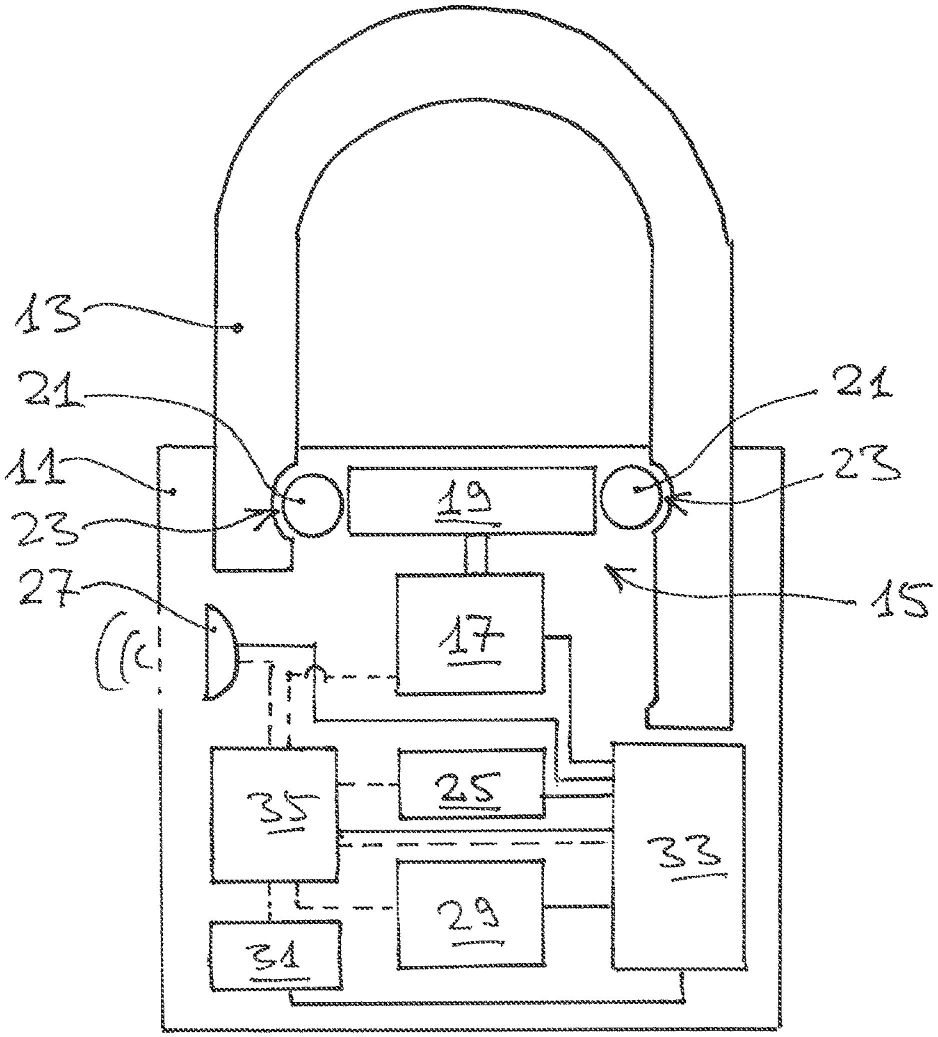
13
21
21
11
23
23
19
27
17
15
35
25
33
29
31

PORTABLE ELECTRONIC LOCK

The invention relates to a portable electronic lock that has a lock body having a locking device and a closing hoop that is movable relative to the lock body between a closed position and an open position, wherein the closing hoop may be locked to the lock body by means of the locking device in the closed position.

In mobile applications, such a lock may serve to fix an object—for example, a two-wheeler—to a stationary object or to immobilize the object. Such a lock may also serve to be selectively attached to a securing device of a stationary object—for example, to a hasp of a building door—in order to secure access.

Such a lock may further have an electrical unit, an electrical energy source, a signal generator, and a control unit. The control unit may be connected to the electrical unit, to the electrical energy source, and to the signal generator, in particular to control the electrical unit and the signal generator and to be supplied with energy by the electrical energy source. The electrical unit may be part of the locking device of the lock or may be independent thereof. By integrating an electrical unit into the lock, in particular into the lock body, an extended functional scope of the lock may be made possible, for example, in the case of an electromechanical locking device, an electronic control of the locking device by local authentication (e.g. by means of a biometric sensor, or by means of an RFID transmission/reception unit, or by inputting a code directly at the lock or via a mobile end device). An extended functional scope of the lock may alternatively or additionally also comprise an alarm function, a remote query of states, or a remote control. In a mobile lock, a separate electrical energy source is required for this purpose, in particular a battery, for example an electrical accumulator. The control unit may be configured to monitor a charge level of the electrical energy source.

For example, a U hoop lock having an electromechanical locking device and an alarm device is known from DE 10 2018 111 302 A1. A portable folding lock for two-wheelers having an alarm device is known from DE 10 2017 105 031 A1.

In the operation of the lock, acknowledgment signals or warning signals may be output to the user, in particular as acoustically or optically perceptible signals. For this purpose, the lock may in particular have an acoustic signal generator (for example, a piezo signal generator) or an optical signal generator (for example, a light emitting diode). An acoustic or optical signal generator may be easily accommodated in a portable lock and is robust, which is in particular of advantage if the portable lock is also to be used outdoors. For example, provision may be made that acknowledgment signals are output to the user for the states "unlocking command received/executed", "locking command received/executed", "command for activating the alarm device received/executed", and/or "command for deactivating the alarm device received/executed". However, the number of acknowledgment signals or warning signals that may be distinguished by the user is limited.

If the energy content stored in the electrical energy source gradually runs low in the course of the operation of the portable lock—which is a relatively rare occurrence compared to the locking and unlocking processes—and if this is to be indicated to the user by a further (e.g. acoustic or optical) signal, this warning signal is possibly not recognized or misinterpreted by the user. In contrast, in portable locks, a display device (display) that could display a corresponding textual warning message is often too complex, too large, too sensitive with respect to weather conditions, and has too high an energy consumption.

It is an object of the invention to provide a portable lock of said kind that provides the user with a better perceptible warning in the event of a charge level of the electrical energy source running low.

This object is satisfied by a portable electronic lock comprising a lock body and a closing hoop, the lock body having a locking device and the closing hoop being movable relative to the lock body between a closed position and an open position. The locking device is configured to lock the closing hoop at the lock body in the closed position. The portable electronic lock at least has an electrical unit, an electrical energy source, a signal generator, and a control unit. The control unit is configured to monitor a charge level of the electrical energy source and to control the signal generator to output a charge level warning signal sequence in the form of the letter sequence "S-O-S" in accordance with Morse code if the charge level of the electrical energy source falls below a predetermined limit value.

In such a lock, the control unit may monitor whether the remaining capacity of the electrical energy source falls below a predetermined limit value. This may, for example, take place by monitoring a voltage threshold value or by monitoring the consumption of electrical energy. For example, the control unit may carry out a balancing an amount of energy taken from the electrical energy source with respect to an amount of energy supplied to or initially present in the electrical energy source. The predetermined limit value may in particular correspond to a value in the range from 5% to 20%, for example a value of 10% or 15% or 20%, of the nominal capacity of the electrical energy source.

If the monitoring reveals that the level of electric charge of the electrical energy source (i.e. the charging state) falls below a predetermined limit value, the control unit may (directly or as a result of a further trigger, as explained below) control the signal generator of the lock to output a charge level warning signal sequence. This charge level warning signal sequence corresponds to the letter sequence "S-O-S" in accordance with Morse code.

The letter sequence "S-O-S" (as an abbreviation for "Save Our Souls") is familiar to many people, is easily identifiable as an acoustic or optical signal, and may be easily associated with a critical state by a vast majority of users. In connection with a portable lock, the transmission of an "S-O-S" signal is unusual and may be easily associated by the user with an "emergency call" of the lock itself. The use of the letter sequence "S-O-S" for the relatively rarely occurring event of an energy supply of the electrical source running low is thus particularly memorable and easily recognizable for the user. Consequently, misinterpretations and the missing of a timely replacement or recharging of the electrical energy source may be better avoided. As such, an inopportune failure of the lock's electrical unit due to an unexpected depletion of energy supply is reliably prevented, without requiring expensive and/or space-consuming signaling devices, such as a display for textual messages, in order to alert the user in a timely and easily recognizable manner. The charge level warning signal sequence may in particular be output at a volume or intensity that corresponds to a perception range (e.g. auditory range or visual range) of a few meters, for example, a maximum of 20 meters, or a maximum of 10 meters, or a maximum of 3 meters, or a maximum of 2 meters under typical environmental conditions. It is thus prevented that the charge level warning signal sequence alerts, or unnecessarily alarms, other persons than the user in the vicinity of the lock. In the case of an acoustic signal generator, the volume at which the charge level warning signal sequence is output may in particular be lower than the volume at which an alarm signal of an alarm device of the lock is output.

The charge level warning signal sequence may in particular comprise a sequence of three short signals, three long signals, and three short signals, in particular a sequence of three short tones, three long tones, and three short tones (at the same pitch or at a different pitch).

Further embodiments of the invention will be explained in the following.

In some embodiments, the signal generator may be configured as an acoustic signal generator, such as a piezo signal generator, for outputting signal tones. The charge level warning signal sequence may then be formed by a charge level warning tone sequence.

Alternatively or additionally to an acoustic signal generator, the lock may also have an optical signal generator, for example one or more light emitting diodes.

In a compact, robust and inexpensive embodiment, the portable electronic lock is devoid of a display configured to display a textual warning message.

In some embodiments, the electrical unit of the lock may comprise at least one of the following devices:

- an electrical drive device that is configured to drive a latch of the locking device;
- an electronic alarm device that is configured to detect a manipulation attempt and to output an acoustic alarm signal via the signal generator; and/or
- a radio communication device.

An electromechanical locking device may be implemented by providing an electrical drive device. The latch of the locking device may lock the closing hoop of the lock directly (for example, by engaging into the closing hoop) or indirectly (for example, via a driven blocking element or by engaging behind a blocking element associated with the closing hoop). The latch may lock at least one end of the closing hoop to the lock body in a locked position and may release the respective end of the closing hoop for a release from the lock body in a release position. The electrical drive device may, for example, have an electric motor, in particular a gear motor, or an electromagnet.

On a use of an electrical drive device, the control unit may be configured not to control the electrical drive device to drive the latch into a locked position if the charge level of the electrical energy source falls below a threshold value. This threshold value may correspond to said predetermined limit value or to another limit value. The lock may hereby be prevented from being locked even though not enough energy will presumably be available to subsequently unlock the lock again. Said other limit value may in particular correspond to a lower charge level than said predetermined limit value for the output of the charge level warning signal sequence.

Alternatively to an electromechanical locking device, the locking device may be configured as a purely mechanical locking device, particularly as a locking device comprising a key-operated cylinder or comprising rotatable code rings.

The alarm device may have an acceleration sensor. Such an acceleration sensor may in particular be configured as a vibration sensor by means of which vibrations may be detected which the portable electronic lock typically experiences during a break-open attempt. This makes it possible to recognize break-open attempts and thereupon to trigger an alarm signal, in particular an acoustically perceivable alarm signal, or to output it via the signal generator. The control device of the lock may be configured to control the alarm device. The control device may in particular be configured to activate or deactivate the alarm device in order, for example, to prevent the triggering of an unwanted alarm signal.

The radio communication device may have a radio transmitter and/or a radio receiver, for example to receive control commands and/or authentication signals of the authorized user and/or to transmit status information or confirmation signals. The radio communication device may in particular communicate with a radio remote control or with a mobile end device of the user (for example, a smartphone).

In some embodiments, the control unit may be configured to only control the signal generator to output the charge level warning signal sequence when an actuation of the lock is determined by means of the control unit. Thus, the charge level warning signal sequence is not necessarily output immediately on the reaching or determination of said predetermined limit value, but rather only when an actuation triggering the output of the charge level warning signal sequence takes place at the portable lock, in particular an actuation by an authorized user. It is hereby achieved that the charge level warning signal sequence is only output when a user, in particular the authorized user, is in the vicinity of the portable lock.

The monitoring of the charge level of the electrical energy source by means of the control unit may take place regularly or may likewise only take place when the control unit determines an actuation of the lock triggering the checking of the charge level, in particular an actuation by an authorized user.

In connection with the invention, an authorized user may be a user who has the secret code of the lock (an electronic secret code, for example as a numerical code or as a transponder, or a mechanical secret code, for example as a mechanical key) and/or whose biometric data are stored in the lock so that an authentication may be performed (for example, a fingerprint).

An actuation of the lock that may be determined by the control unit and that triggers the output of the charge level warning signal sequence and/or the checking of the charge level of the electrical energy source may, for example, comprise:

- an actuation of a biometric sensor of the lock, for example of a fingerprint sensor, wherein, in some embodiments, an "actuation of the lock" is in particular only present when the actuation of the biometric sensor leads to a successful authentication of the user;
- a reception of a radio signal (e.g. mobile radio, Bluetooth, WLAN, RFID) that represents an unlocking command or a locking command and/or that has an authorized user; and/or
- an actuation of a switch of the lock;
- an actuation of a lock cylinder of the locking device by means of an associated key.

The closing hoop of the portable lock may, for example, be single-ended or have two ends.

In some embodiments, the closing hoop of the portable lock may comprise a rigid hoop (for example, a U-shaped shackle in a padlock) or a flexible hoop, in particular a jointed bar hoop (for example, in a folding lock), a metal wire, or a chain.

In some embodiments, the closing hoop of the portable lock may have at least one free end that may be locked to the lock body to form a closed loop. In some embodiments, the closing hoop may have a further end that is permanently connected to the lock body.

In some embodiments, in particular in a portable lock configured as a padlock, a U-shaped closing hoop having two limbs of different lengths may be provided, wherein the long limb is permanently secured to the lock body and only the short limb is released from the lock body in the open position. This may enable the U hoop to pivot about the axis of the long limb so that the U hoop may be guided through an object, starting from the short limb, without the closing hoop having to be completely released from the lock body.

In some embodiments, the closing hoop of the portable lock may comprise a bolt (e.g. pin-shaped bolt) that is released from the lock body in the open position and that is inserted into the lock body in the closed position. For example, such a lock may be configured as a brake disk lock for motorcycles.

As explained above, the control unit may be configured not to drive the latch into a locked position if the charge level of the electrical energy source falls below a threshold value. Such omission of the locking of the lock on too low a charge level of the electrical energy source forms an independent aspect of the present invention and is also advantageous when the control unit does not control the signal generator of the lock to output the above-explained “S-O-S” charge level warning signal sequence. In this respect, the invention also generally relates to a portable electronic lock that has a lock body having a locking device and a closing hoop that is movable relative to the lock body between a closed position and an open position, wherein the closing hoop may be locked to the lock body by means of the locking device in the closed position, wherein the locking device has at least one latch for locking the closing hoop in the closed position and an electrical drive device (for example, an electric motor or an electromagnet) for driving the latch, wherein the lock has an electrical energy source and a control unit, wherein the control unit is configured to monitor a charge level of the electrical energy source, and wherein the control unit is configured not to control the electrical drive device to lock the closing hoop (in particular to drive the latch into a locked position) if the charge level of the electrical energy source falls below a predetermined threshold value. As explained, the lock may hereby be prevented from being locked even though not enough energy is expected to be available to subsequently unlock the lock or the closing hoop again.

Said predetermined threshold value may correspond to a value in the range from 5% to 20%, for example to a value of 15% or 10% or 5%, of the nominal capacity of the electrical energy source.

This omission of the locking of the lock or of the closing hoop may in particular even be provided when a locking command is received, for example on the basis of the signal of a sensor that represents an insertion of the closing hoop into the lock body.

In another respect, further embodiments of such a lock may be provided as is explained for the lock with an output of the “S-O-S” charge level warning signal sequence.

The invention will be described in the following purely by way of example with reference to an embodiment and to the drawing.

FIG. 1 shows a schematic diagram of a portable electronic lock configured as a padlock.

FIG. 1 shows a portable or mobile lock having a lock body 11 and a U-shaped closing hoop 13. An electromechanical locking device 15 is arranged in the lock body 11. The locking device 15 comprises an electric motor 17, a rotating latch 19 in the form of a cam driven by the electric motor 17, and two blocking elements 21.

In a locked position of the rotating latch 19, the blocking elements 21 are urged radially outwardly into engagement recesses 23 of the closing hoop 13. The closing hoop 13 is thus locked in the closed position shown in FIG. 1 and forms a closed loop. In a release position of the rotating latch 19, the blocking elements 21 are released for a radially inward moving back so that the closing hoop 13 may be moved from the closed position shown into an open position. Starting from the open position, the closing hoop 13 may be moved manually into the closed position and may then be electromechanically locked again.

An acceleration sensor 25, an acoustic signal generator 27, a fingerprint sensor 29, a radio communication device 31, and an electrical energy source in the form of a battery 33 are further arranged in the lock body 11. The battery 33 supplies the electric motor 17, the acceleration sensor 25, the signal generator 27, the fingerprint sensor 29, and the radio communication device 31 with electrical energy. Furthermore, an electronic control unit 35 is provided that controls the electric motor 17 in response to signals of the fingerprint sensor 29 and to command signals, which are received via the radio communication device 31, to unlock the closing hoop 13. The control unit 35 is furthermore configured to evaluate the signals of the acceleration sensor 25 with respect to vibrations in an alarm mode in order to control the signal generator 27 to output an alarm signal tone on the detection of vibrations. Therefore, the control unit 35 is hereby configured as an alarm device that may be selectively activated or deactivated.

The control unit 35 is further configured to control the signal generator 27 to output acoustic acknowledgment signals to the user, namely for the states “unlocking command received”, “locking command received”, “alarm mode activated”, and “alarm mode deactivated”.

The control unit 35 is furthermore configured to monitor and evaluate the charge level of the battery 33, wherein the control unit 35 controls the signal generator 27 to output a charge level warning signal sequence in the form of a charge level warning tone sequence if the detected (e.g. determined or calculated) charge level of the battery 33 falls below a predetermined limit value (e.g. 20% of the nominal capacity). This charge level warning signal sequence has the form of the letter sequence “S-O-S” according to Morse code, that is a sequence of three short tones, three long tones, and three short tones. Even if it is only rarely output, this letter sequence may be easily identified by the user and associated with the expected event of the energy supply running low, so that the user may take the necessary countermeasures in good time (replacing or recharging the battery 33).

However, the control unit 35 only controls the signal generator 27 to output the charge level warning signal sequence when a signal is received from the fingerprint sensor 29 or the radio communication device 31 and it may thus be assumed that the authorized user is in the vicinity of the lock and also perceives the charge level warning signal sequence.

In accordance with an independently advantageous aspect, even on the reception of a locking command (e.g. via the fingerprint sensor 29, the radio communication device 31, or a further sensor that may in particular represent an insertion of the closing hoop 13 into the lock body 11), the control unit 35 is further configured not to control the electric motor 17 to lock the closing hoop 13 if the detected charge level of the battery 33 falls below a predetermined threshold value. The closing hoop 13 may hereby be prevented from being locked even though not enough energy will provisionally be available to subsequently unlock the closing hoop 13 again.

Whereas the invention was explained above with reference to a lock in which the closing hoop 13 is manually moved from the open position into the closed position, it is also possible within the framework of the invention to drive not only the rotating latch 19, but also the closing hoop 13 by means of the electric motor 17 (to make a movement from the open position into the closed position and/or from the closed position into the open position).

REFERENCE NUMERAL LIST

11 lock body
13 closing hoop
15 locking device
17 electric motor
19 rotating latch
21 blocking element
23 engagement recess
25 acceleration sensor
27 signal generator
29 fingerprint sensor
31 radio communication device
33 battery
35 control unit

The invention claimed is:

1. A portable electronic lock comprising a lock body and a closing hoop, the lock body having a locking device and the closing hoop being movable relative to the lock body between a closed position and an open position,
wherein the locking device is configured to lock the closing hoop at the lock body in the closed position,
wherein the portable electronic lock at least has an electrical energy source, a signal generator, and a control unit,
wherein the signal generator is an acoustic signal generator that outputs acoustically perceptible signals,
wherein the control unit is configured to control the signal generator to output a charge level warning signal sequence in the form of the letter sequence "S-O-S" in accordance with Morse code if a charge level of the electrical energy source falls below a predetermined limit value,
wherein the control unit is configured to only control the signal generator to output the charge level warning signal sequence when an actuation of the portable electronic lock by an authorized user is determined.

2. The portable electronic lock in accordance with claim 1,
wherein the charge level warning signal sequence comprises a sequence of three short signals, three long signals, and three short signals.

3. The portable electronic lock in accordance with claim 1,
wherein the portable electronic lock is devoid of a display that could display a textual warning message.

4. The portable electronic lock in accordance with claim 1,
further comprising an electrical drive device that is configured to drive a latch of the locking device.

5. The portable electronic lock in accordance with claim 4,
wherein the electrical drive device has an electric motor or an electromagnet.

6. The portable electronic lock in accordance with claim 3,
wherein the control unit is configured not to control the electrical drive device to lock the closing hoop if the charge level of the electrical energy source falls below a threshold value.

7. The portable electronic lock in accordance with claim 6,
wherein the threshold value corresponds to a charge level that is lower than the predetermined limit value.

8. The portable electronic lock in accordance with claim 1,
further comprising an electronic alarm device that is configured to detect a manipulation attempt and to output an acoustic alarm signal via the signal generator.

9. The portable electronic lock in accordance with claim 8,
wherein the electronic alarm device has an acceleration sensor.

10. The portable electronic lock in accordance with claim 1,
further comprising a radio communication device which comprises at least one of a radio transmitter or a radio receiver.

11. The portable electronic lock in accordance with claim 1,
wherein the closing hoop comprises a rigid hoop or a flexible hoop.

12. The portable electronic lock in accordance with claim 1,
wherein the closing hoop has at least one free end that can be locked to the lock body to form a closed loop.

13. The portable electronic lock in accordance with claim 1,
wherein the closing hoop has a bolt that is released from the lock body in the open position and that is inserted into the lock body in the closed position.

* * * * *